United States Patent
Storey et al.

(10) Patent No.: US 6,234,983 B1
(45) Date of Patent: May 22, 2001

(54) REQUEST-AND-RESPOND APPROACH TO REDUCING LATENCY WITHIN A TRACKING SYSTEM

(75) Inventors: John J. Storey, Nottingham; Mark Purser, Leicester, both of (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/338,014

(22) Filed: Jun. 22, 1999

Related U.S. Application Data
(60) Provisional application No. 60/090,745, filed on Jun. 26, 1998.

(51) Int. Cl.[7] .................................................. A61B 5/103
(52) U.S. Cl. .............................................................. 600/595
(58) Field of Search ................................... 370/475, 395, 370/396, 397; 128/782; 235/472; 340/988; 382/103; 348/169, 170, 171, 172; 600/595

(56) References Cited

U.S. PATENT DOCUMENTS

| | | | |
|---|---|---|---|
| 5,373,857 | * 12/1994 | Travers et al. | 128/782 |
| 5,592,401 | 1/1997 | Kramer | 364/550 |
| 5,615,132 | * 3/1997 | Horton et al. | 364/516 |
| 5,703,349 | * 12/1997 | Meyerson et al. | 235/472 |
| 5,761,326 | 6/1998 | Brady et al. | 382/103 |
| 5,793,382 | 8/1998 | Yerazunis et al. | 345/474 |
| 5,889,764 | 3/1999 | Needham et al. | 370/263 |

* cited by examiner

*Primary Examiner*—Chau Nguyen
*Assistant Examiner*—Alexander Boakye
(74) *Attorney, Agent, or Firm*—Law Offices of Terry McHugh (57) ABSTRACT

A method of managing latency in a system for tracking movement of an object includes providing a request-and-response mechanism for transferring tracking data across a communications link. In one embodiment, the object for which movement is to be tracked is a human head and the system is a virtual reality system. Packets of the tracking data may be generated using a conventional sensor processing technology, but the packets are transferred via the communications link to an image processing capability, such as that of a host computer. The packets are generated at a fixed sample rate that is asynchronous with respect to the processing requirements of the host computer. When the host computer is available for fresh tracking data, a packet-transfer request is transmitted to the source of the packet. Latency can be reduced by enabling the source of the packets to anticipate reception of a packet-transfer request. Thus, any incoming signal to the source is "prematurely" interpreted as a packet-transfer request. Appropriate actions are executed, if the interpretation is subsequently determined to be inaccurate. As a technique for reducing variability of latency, each transfer of a packet is preceded by a determination of whether to transmit a presently available packet or a next available packet. If a request is received momentarily before the next available packet is accessible, the presently available packet may be identified as "stale," and the next packet may be transmitted when available.

17 Claims, 7 Drawing Sheets

REQUEST-AND-RESPOND APPROACH TO REDUCING LATENCY WITHIN A TRACKING SYSTEM

This application claims the benefit of U.S. Provisional Application No. 60/090,745, filed Jun. 26, 1998.

TECHNICAL FIELD

The invention relates generally to motion tracking systems and more particularly to managing latency in a system for tracking movement of an object, such as a human head.

DESCRIPTION OF THE RELATED ART

There are a wide variety of applications in which it is desirable to rapidly and continuously determine the location and orientation of at least one object. Applications range from enabling virtual reality in a pilot training or game environment to enabling low-invasive surgery. In each of these uses, a high degree of sophistication is needed in designing system components, such as sensor circuitry for generating raw data and sensor processing circuitry for manipulating the raw data to extract location and orientation information.

Techniques for providing the raw data include utilizing multiple light sources and detectors that enable optical tracking by triangulation, using electromagnetic devices that generate electrical signals, and using magnetic sensors that are responsive to the magnetic field of the earth. U.S. Pat. No. 5,373,857 to Travers et al. describes a head tracking apparatus for a virtual reality system that tracks the movement of a person's head based upon a magnetic sensor that is embedded in a helmet and that is responsive to the earth's magnetic field.

In a system for tracking movement of an object, total latency is determined by the sum of the latency imposed by a tracking subsystem and the latency imposed by a display subsystem. The latency imposed by the tracking subsystem is determined by the physical characteristics of the sensors that generate the raw data, the delays introduced by the signal processing required to extract the appropriate angular and positional data from the raw data, and the transport delays required to transfer the angular and positional data to the display subsystem. This tracking latency is defined as the delay between a stimulus and the time at which the data pertaining to the stimulus is received by the processor of the display subsystem. In a head tracking system, the stimulus is in a form of head movement and the display subsystem generates image data for a trackable display device, such as a helmet-mounted display. The latencies of the display subsystem result from the finite time taken by the processor to render each new scene, using fresh head orientation and positional data from the tracking subsystem.

For a virtual reality application, if the sum of all latencies from the original head motion to the final displayed image is too great, there is a strong tendency that the user will suffer from some degree of "simulator sickness." Simulator sickness is caused by the conflict in the person's cognition between its own head positional sensing and the virtual reality view that is presented at the display device. While simulator sickness is a particular concern to head tracking systems, minimizing latency is also a goal in the design of other types of tracking systems, such as those that monitor the position and orientation of a human hand.

U.S. Pat. No. 5,592,401 to Kramer describes a method of managing delays in a virtual reality system. By employing a combination of position-sensing technologies, position information from the combination provides a less delayed representation without an unacceptable reduction in the accurate reporting of movement of an object. Specifically, more than one sensor is used, with each sensor having different deficiencies and proficiencies. A first sensor may be highly accurate, but may provide a delayed signal with a latency that is unacceptable in many applications. A second sensor technology may provide high speed results, but with a susceptibility to drift and other inaccuracies. The combination of signals may be used to obtain high resolution, real time depictions of movement.

The delay of packets having positional data in a virtual reality system is also considered in U.S. Pat. No. 5,793,382 to Yerazunis et al. The patent is particularly concerned with providing smooth motion in a shared distributed virtual reality system, since jitter is likely to occur as a result of lost or delayed packets in a network environment. Smoothing is achieved by providing redundant data in packets, so that if one packet is lost, adjacent packets contain sufficient information to smooth the perception of displayed motion. As another technique, extrapolation is used in position, axis of rotation and angle of rotation, in the event of large amounts of missing data. Moreover, the information in the packets is categorized as to the predictability of future motion, and appropriate smoothing algorithms are applied based upon the predicted knowledge of what the future motion is likely to be. The system switches between a linear interpolation algorithm for less predictable data and a Catmull-Rom spline for more predictable data.

In addition to the previously recognized causes of disorientation and reduced perceived quality in a tracking system, it has been determined that variability in latency can lead to the perception of jitter. In this case, variability in the latency of the tracking data causes variable "step-sizes" between frames of the display. As a result, the perception of smooth movement is diminished. Variability in latency is primarily a result of asynchronous processing between the circuitry for generating the tracking data and the circuitry for driving the graphical display. Typically, tracking data is supplied at a fixed sample rate, while the time needed to render successive scenes is often scene-dependent.

Figure 1:
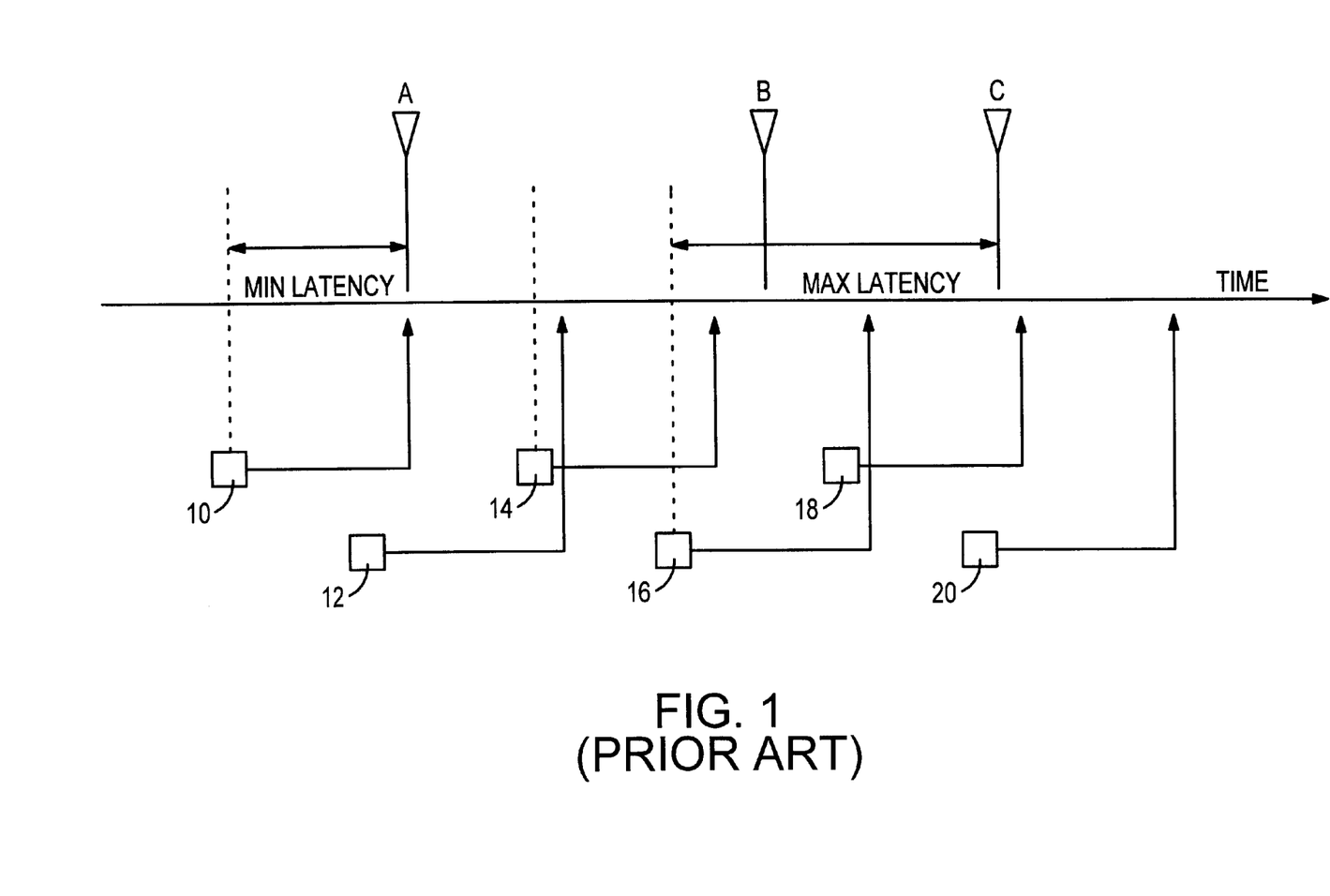
FIG. 1 is an illustration of an example of the timing between tracking data availability and image processing requirements using a system that is conventional to the prior art.

Variable latency will be described with reference to FIG. 1. Three times at which fresh tracking data is required for processing by a graphics driver are represented by points A, B and C. Since graphical processing requirements are scene-dependent, the spacing between time A and time B is different than the spacing between time B and time C. On the other hand, there are six sample times 10, 12, 14, 16, 18 and 20 which are equidistantly spaced to represent the capture of raw data from a sensor or sensors. The horizontal lines extending from the sampling periods 10–20 represent the scene-independent latency required for extracting positional and angular information from the raw data and for transporting the extracted information to the processor for a graphics driver. Typically, the graphics driver is contained in a host computer connected to the sensor processing by a data link which may be a wired or wireless connection.

As can be seen at time A, the fresh tracking data is coincident with the requirement for fresh tracking data, so the system latency is minimized. However, at time B and time C, the availability of the host for fresh tracking data is not coincident with the arrival of the data. At time B, the additional system latency is relatively small, since the supplied data from the sampling at point 14 arrived only shortly before time B. The latency associated with time C is significantly longer, since the last-supplied packet of tracking data was extracted from the sampling at point 16.

Because the host computer has no way of knowing that a short wait would enable it to access tracking data extracted from the sampling point 18, the last-supplied packet of tracking data is utilized in the graphics processing. Thus, there is a Attorney Docket No. RET-001 different system latency for each of the three accesses of packets of tracking data at times A, B and C.

Increasing the sample rate of acquiring raw data leads to lower variability and the system latency experienced by the host computer, since the difference between the minimum latency and the maximum latency will always be less than one sample period. However, simply increasing the sample rate is not ideal from a system point of view. Firstly, the data must be transferred to the host computer via some form of data link. For ease of interfacing with most graphics hosts, this may be a serial link conforming to the RS-232C standard. Alternatively, for IBM-PC compatible machines, the link may include a bidirectional parallel port or Universal Serial Bus connection. For each of these interfaces, there needs to be software running on the host computer which will process each packet of information corresponding to one tracker sample before the next packet is accessed to update the display. The host computer will typically be running a complex operating system which is not ideally suited to real time servicing of fast I/O. Interrupt service routines are required to guarantee that asynchronous data is correctly processed, and due to the increasing layers of software within modern multitasking operating systems, this can require a significant fraction of the processor bandwidth. This is undesirable, as the host computer may be required to generate three-dimensional renderings of the virtual world, a task that often requires maximum processor bandwidth.

What is needed is a method of tracking movement of an object and managing latency within the tracking, such that the resulting tracking system has a reduced susceptibility to jitter and "simulator sickness."

SUMMARY OF THE INVENTION

A method of managing latency in a system for tracking movement of an object, such as a human head in a virtual reality system, includes providing a request-and-response approach to transferring tracking data.

Packets of the tracking data may be generated using a conventional sensor processing technology, but the packets are transferred to downstream processing only in response to packet-transfer requests.

In the preferred embodiment, the downstream processing is included in a host computer having an image display driver. The packets are generated at a fixed sample rate that is asynchronous with the processing requirements of the host computer. A data link is used to transfer the packets to the host computer. The type of link is not critical and can be a wireless or wired connection. Typically, image processing is scene-dependent and occurs at a speed that is less than the sample rate for generating the packets.

When the host computer is available for fresh tracking data, a packet-transfer request is transmitted to the source of the tracking data packets. Preferably, the requests are transmitted using the same data link as the opposite flow of packets of the fresh tracking data.

The request-and-respond approach frees the determination of the sample rate of packet generation from considerations relating to the interface mechanism with the host computer. Thus, a high sampling rate may be selected to reduce the maximum variability of data latency. The high sampling rate has additional advantages with regard to conventional tracking algorithms, since the accuracy of the integration and accumulation of the various packets will be improved. Oversampling also provides advantages in terms of the minimization of analog-to-digital conversion aliasing artifacts, and improves headroom to apply digital filter techniques to the data being processed.

As previously noted, the method and system may be used for tracking head movement in a virtual reality system, so that head movement is displayed in substantially real time. The display may be a three-dimensional rendering, with displayed movement being based on image information that is generated from the request-and-respond acquisition of packets of tracking data.

Latency may be further diminished by enabling the sensor circuitry to anticipate reception of a packet-transfer request. This aspect is particularly beneficial if the host computer transmits more than the packet-transfer requests to the sensor circuitry. Other types of signals that may be transmitted include signal configuration commands. In the preferred embodiment, the detection of any incoming signal from the host computer is anticipated to be a request for a packet. Rather than waiting for complete reception and correct interpretation of the incoming signal from the host computer, the sensor circuitry may anticipate that the incoming signal is a request and prepare a packet of tracking data for transmission upon completion of the incoming signal. At the sensor end of the data link, the incoming signal is then correctly interpreted to determine if further action is required. At the host computer end of the data link, the transmitted packet is received, but discarded if it is not a correct response to the signal that was originally transmitted by the host computer. In an RS-232 protocol, by using the head/synchronization bit of a host-bound packet to identify the packet as either containing tracking data or other purpose data, the host computer can efficiently discard any extra packets of tracking data.

In order to reduce variability of latency, the sensing circuitry is preferably enabled to select between transmitting a presently available packet of tracking data and a next available packet. Thus, if a request is received from the host computer momentarily before a sampling that generates the next packet, the presently available packet may be identified as "stale," and the next packet may be transmitted when available.

An advantage of the invention is that oversampling can occur at the sensor end of the data link, since the sampling rate is not the same as the packet transfer rate. Thus, the interrupt service routines that are required to guarantee that asynchronous data is correctly processed at the image display end of the link are not triggered. Such interrupt service routines would require processor bandwidth that could not then be used for three-dimensional rendering of a virtual world. Another advantage is that variability of latency is reduced by enabling the selection of transmission of either a presently available packet or a next available packet.

DETAILED DESCRIPTION

Figure 2:
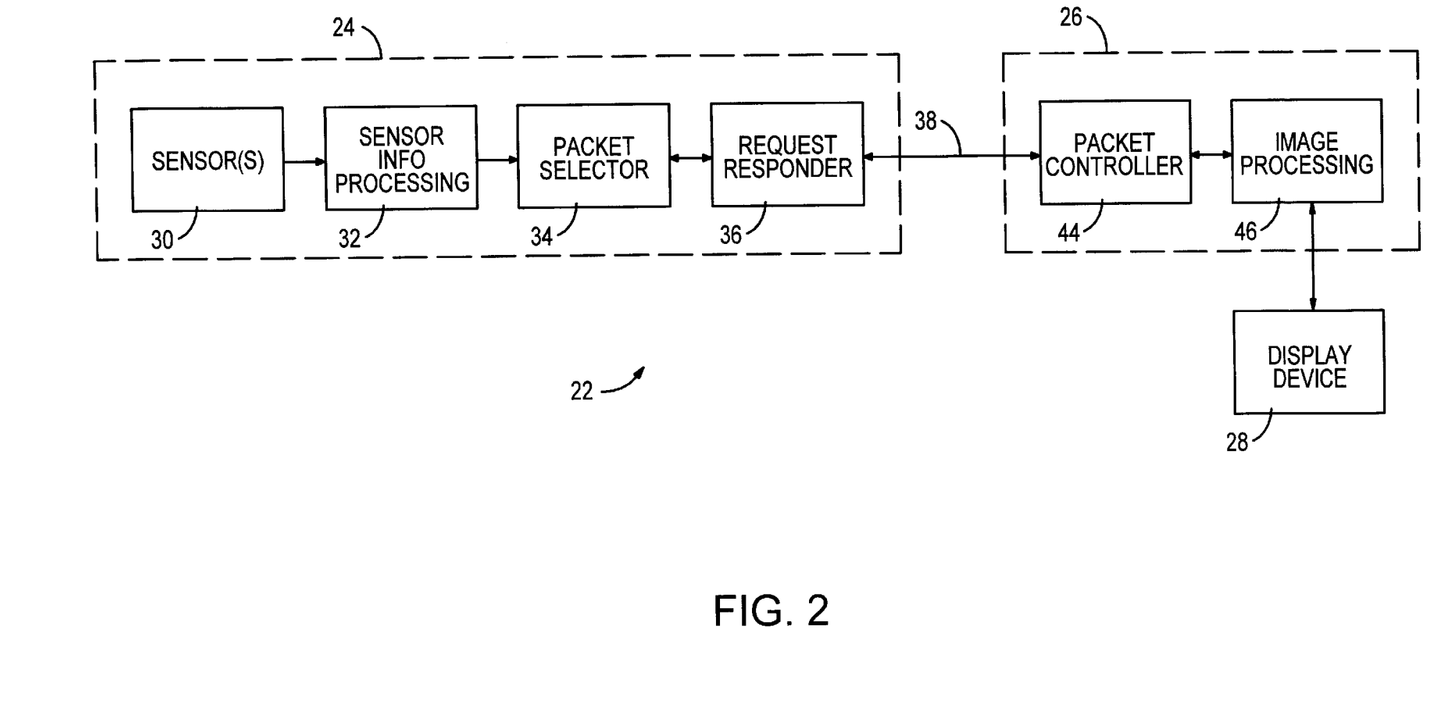
FIG. 2 is a block diagram of components of a tracking system that utilizes a request-and-respond approach to packet transfers, in accordance with the invention.

With reference to FIG. 2, a tracking system 22 is shown as including a sensor subsystem 24 and a display subsystem 26. The display subsystem drives a display device 28. While the system will be illustrated and described with reference to a virtual reality system for tracking head movement, the request-and-respond approach to reducing latency may be utilized in other applications. The approach is best suited for head tracking in a virtual reality system, since "simulator sickness" (i.e., a recognized conflict between actual movement and display of the movement) is most likely to occur in head tracking and since absolute latency is less of an issue if real time processing is not required. However, variability of data latency is a concern in the design of other types of systems for tracking movement of an object, since latency variability may introduce jitter into the display of movement of the object.

The sensor subsystem 24 includes at least one sensor 30 and includes a processing capability 32 for extracting angular and positional information from the raw sensor data. The processing capability is typically a combination of circuitry and computer software. The implementation of the sensors and processing capability is not critical to the invention. As examples, the sensors may be optical or electrical devices or may be responsive to changes in magnetic fields. Ultrasonic devices have also been contemplated. The sensor processing 32 is compatible with the signals from the sensors 30. Raw data is generated by the sensors, while the processing capability extracts either or both of positional information and angular information from the raw data. Processors which determine six variables of motion (three positions and three angles) are known in the art.

The sensor subsystem 24 optionally includes a packet selector 34. As will be described fully below, when a packet-transfer request is received at the sensor subsystem 24, the packet selector determines whether to supply a presently available packet from the sensor processing 32 or wait for generation of the next available packet. This capability reduces the variability of latency in the tracking system 22.

A request responder 36 functions as an interface between the sensor subsystem 24 and the display subsystem 26. The request responder receives signals from the display subsystem, including receiving the packet-transfer requests. In response to receiving a packet-transfer request, a packet of tracking data is transferred to the display subsystem 26 via a data link 38. The implementation of the data link is not critical and may be either a wired or wireless connection.

Figure 3:
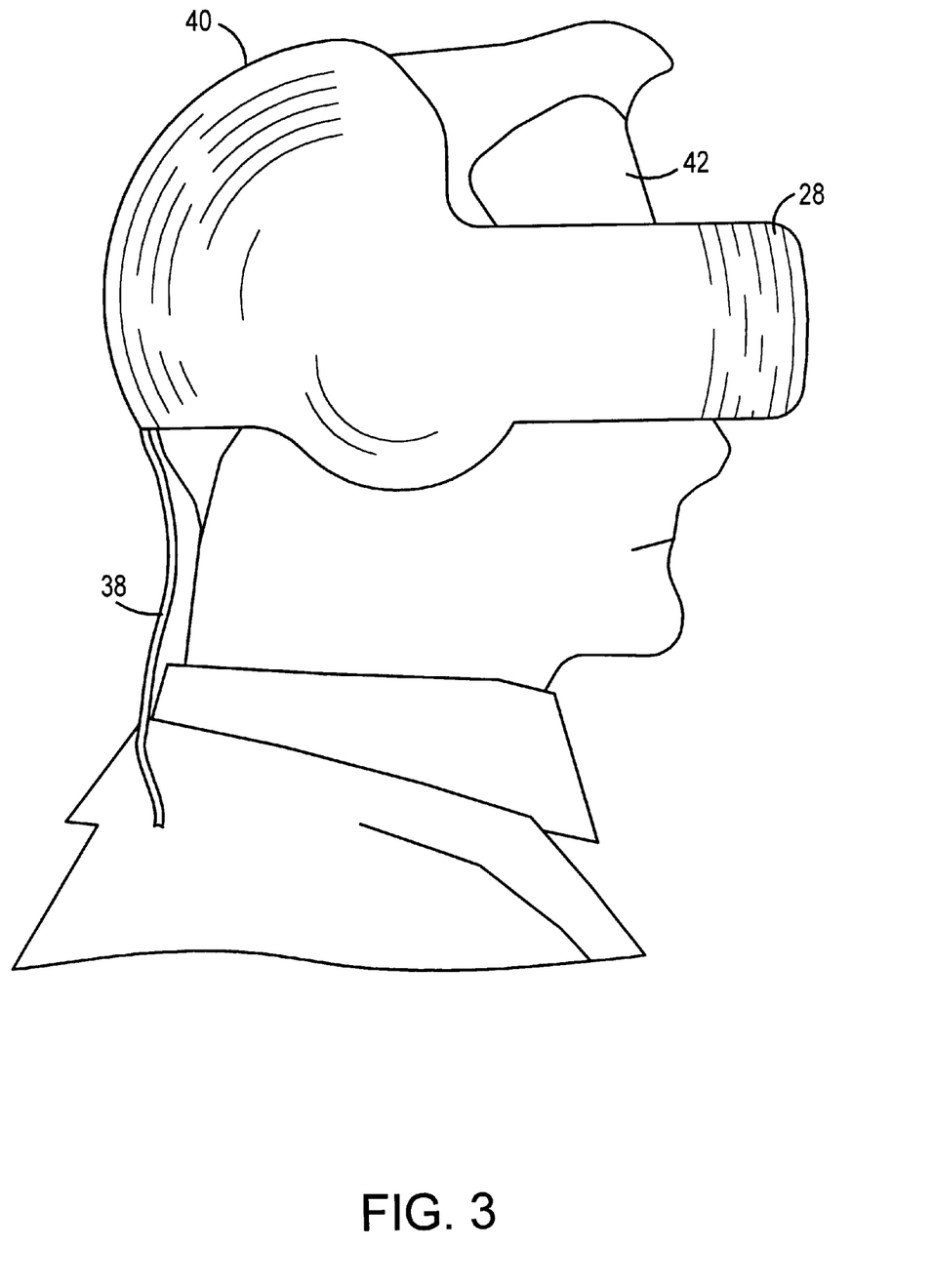
FIG. 3 is a side view of a headset having the sensor circuitry of FIG. 2.

Referring now to FIGS. 2 and 3, the sensor subsystem 24 may be contained within a headset 40 that is worn by a person 42. In a virtual reality application, the display device 28 may be an integral component of the headset. A display screen may be positioned within the headset to generate three-dimensional renderings of a scene that is dependent upon the position of the head of the person. The headset may be used in a game environment or may be used for training purposes, such as pilot training. As an alternative to integrating the display device 28 into the headset 40, the display may be presented on one or more fixed screens.

The data link 38 is shown in FIG. 3 as including a cable extending from the headset 40. However, a wired connection is not required. Communication between the sensor subsystem 24 and the display subsystem 26 may be achieved using optical transmissions, such as bidirectional infrared signaling.

In one embodiment, the data link includes a serial link conforming to the RS-232C standard. If the display subsystem is contained within a personal computer, the link may include a bidirectional parallel port or Universal Serial Bus connection.

The display subsystem 26 includes a packet controller 44 and image processing capability 46. Typically, the display subsystem 26 is a host computer, such as a personal computer. The packet controller 44 regulates the flow of packets of tracking data from the sensor subsystem 24 to the image processing capability 46. The controller may sense when the image processing is available for fresh tracking data and transmit a packet-transfer request to the request responder 36 via the data link 38. The image processing is a combination of circuitry and computer software and its implementation is not critical to the invention. The image processing outputs signals that are compatible with the selected type of display device 28.

Figure 4:
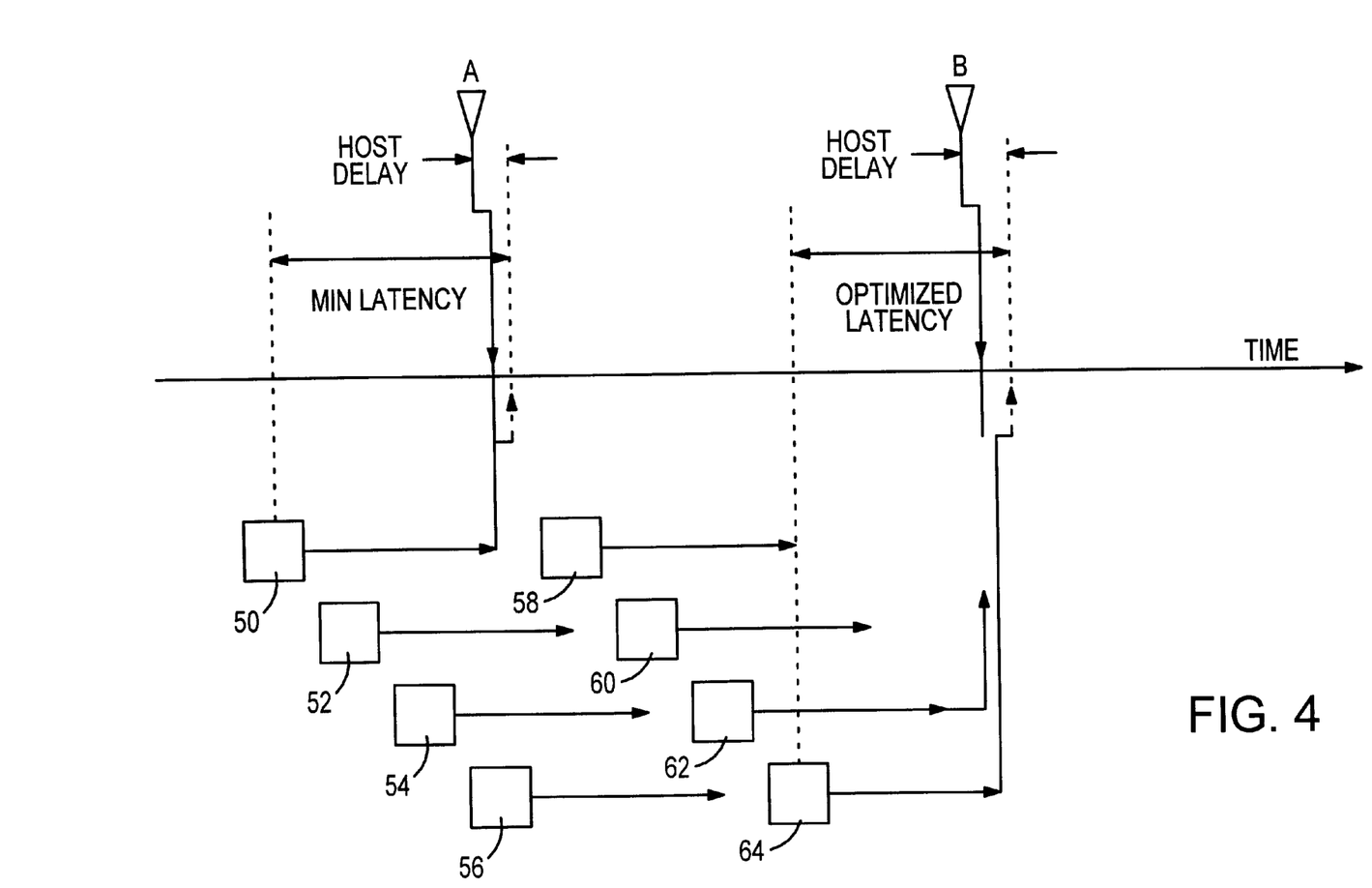
FIG. 4 is an illustration of a timing sequence for generating and transmitting packets of tracking data in the system of FIG. 2.
Figure 5:
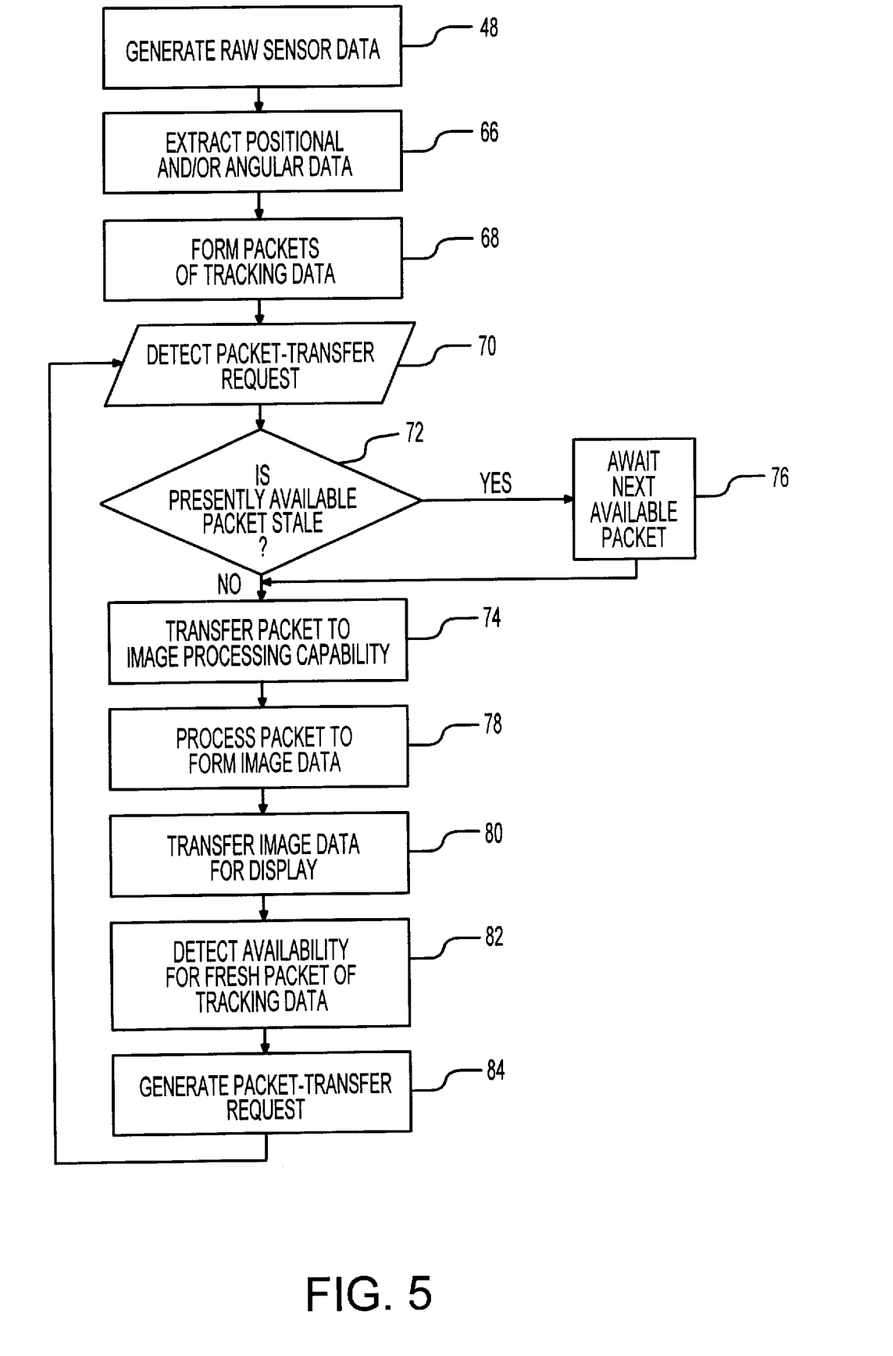
FIG. 5 is a process flow of steps for executing the request-and-respond approach to transmitting packets of tracking data.

The operation of the tracking system 22 will be described with reference to FIGS. 4 and 5. In step 48, raw sensor data is generated. Eight sample times 50, 52, 54, 56, 58, 60, 62 and 64 are illustrated. Conventionally, the sensor data is generated at a fixed sampling rate. In step 66, positional and/or angular data is extracted from the sensor data to enable generation of packets of tracking data in step 68. In FIG. 4, the horizontal lines extending from the sampling times 50–64 represent the tracking latency of the sensor subsystem 24 of FIG. 2. Execution steps 48, 66 and 68 are major components of this sensor latency. Another component is the potential transmit time for transferring a packet to the display subsystem (i.e., the host computer) via the data link 38. However, in accordance with the invention, only a portion of the packets that are formed in step 68 are transferred to the host computer that includes the display subsystem 26. Thus, a high sampling rate can be selected without adversely affecting operations at the host computer. Typically, interrupt service routines are required to guarantee that asynchronous data is correctly processed at the host computer. Due to the increasing layers of software within modern multitasking operating systems, this requirement of interrupt service routine can occupy a significant portion of the processor bandwidth of the host computer. The request-and-respond approach frees the host computer of utilizing the interrupt service routines, while allowing oversampling at the sensor subsystem 24. A high sampling rate reduces the maximum variability of the data latency of the system. Moreover, the high sampling rate enhances the accuracy of the integration and accumulation of the various sensor signals. Oversampling also carries advantages in terms of the minimization of analog-to-digital conversion aliasing artifacts, and provides headroom to apply digital filtering techniques to the data being processed.

At step 70, a packet-transfer request is detected at the request responder 36 of FIG. 2. In a decision step 72, a determination is made as to whether the presently available packet is "stale." This step is executed at the packet selector 34 of FIG. 2, and is not critical to the invention. In FIG. 4, the host computer generates a request at time A. The request is transmitted by the packet controller 44 of FIG. 2. The "step" in the otherwise vertical line extending from time A represents the delay that results from transmitting the packet-transfer request through the data link 38. The request is received at the same time that a packet of tracking data is available from sampling time 50. Thus, the transfer of a packet at step 74 will be the presently available packet from the sampling at time 50. The "step" in the vertical line extending from the horizontal line of sampling time 50 represents the delay in transmitting the packet to the host computer.

At time B, the host computer transmits a packet-transfer request via the data link 38. Again, the "step" in the vertical line represents the delay as a result of the transmission of the request. When the packet-transfer request is received at the request responder 36, the presently available packet will contain tracking data extracted from the sensor data generated at sampling time 62. If the presently available packet is transmitted as the "fresh" tracking data, the total latency will be significantly different than that experienced with respect to processing at time A. This high level of variable latency is avoided by using the optional decision step 72. If it is determined that the quality of image rendering will be greater by awaiting the next available packet (e.g., it is less than half of a sample time to the next available packet), the presently available packet is identified as stale. Consequently, the step 76 of awaiting the next available packet is imposed by the packet selector 34 of FIG. 2. In FIG. 4, the next available packet contains tracking information extracted from the sensor data at time 64. After the packet is available, the awaited packet is transferred to the host computer at step 74. While the "optimized latency" of FIG. 4 is longer than the "minimal latency," the variability is minor relative to that which would have been experienced if the second-transferred packet had been tracking data from the sampling time 62, rather than the sampling time 64.

In step 78, the packet of tracking data that is received as a result of step 74 is processed to form image data. The techniques of performing image processing are not critical. In FIG. 2, the image processing capability 46 need only generate image information that is compatible with the display device 28. The transfer of image data at step 80 may be executed using conventional techniques. Often, frames of image data are sequentially transferred. While not shown in FIG. 2, if the tracking system 22 is a virtual reality system in which the display device is contained within a headset, the data link 38 may be used to transmit the image data to the display device.

The availability of the image processing for a fresh packet of tracking data is detected at step 82. Consequently, a packet-transfer request is generated in step 84 for transfer from the display subsystem 26 to the sensor subsystem 24. This returns the process to the step 70 of detecting the packet-transfer request at the sensor subsystem.

Referring to FIG. 4, the "steps" in the vertical lines that represent communications between the two subsystems are delays imposed by the request-and-respond approach, since the processor of the display subsystem is obligated to wait for the data to be received. However, by using high data rates on the link between the two subsystems, this delay can be offset by the advantage of eliminating the need of multiple interrupts, as required in many prior art virtual reality systems.

The additional latency that is imposed by the request-and-respond approach may be reduced by enabling the request responder 36 of FIG. 2 to "anticipate" reception of a packet-transfer request whenever an incoming signal is detected at the responder. That is, rather than waiting for complete reception and correct interpretation of the incoming signal from the host computer, the responder may anticipate that any incoming signal is a packet-transfer request and prepare a packet of tracking data for transmission upon completion of the incoming signal. At the sensor subsystem end of the data link 38, the incoming signal is subsequently correctly interpreted to determine if further action is required, i.e., if the incoming signal is indeed a packet-transfer request. At the host computer end of the data link, the transmitted packet is received, but is discarded if it is not a correct response to the signal that was originally transmitted by the host computer.

Figure 6:
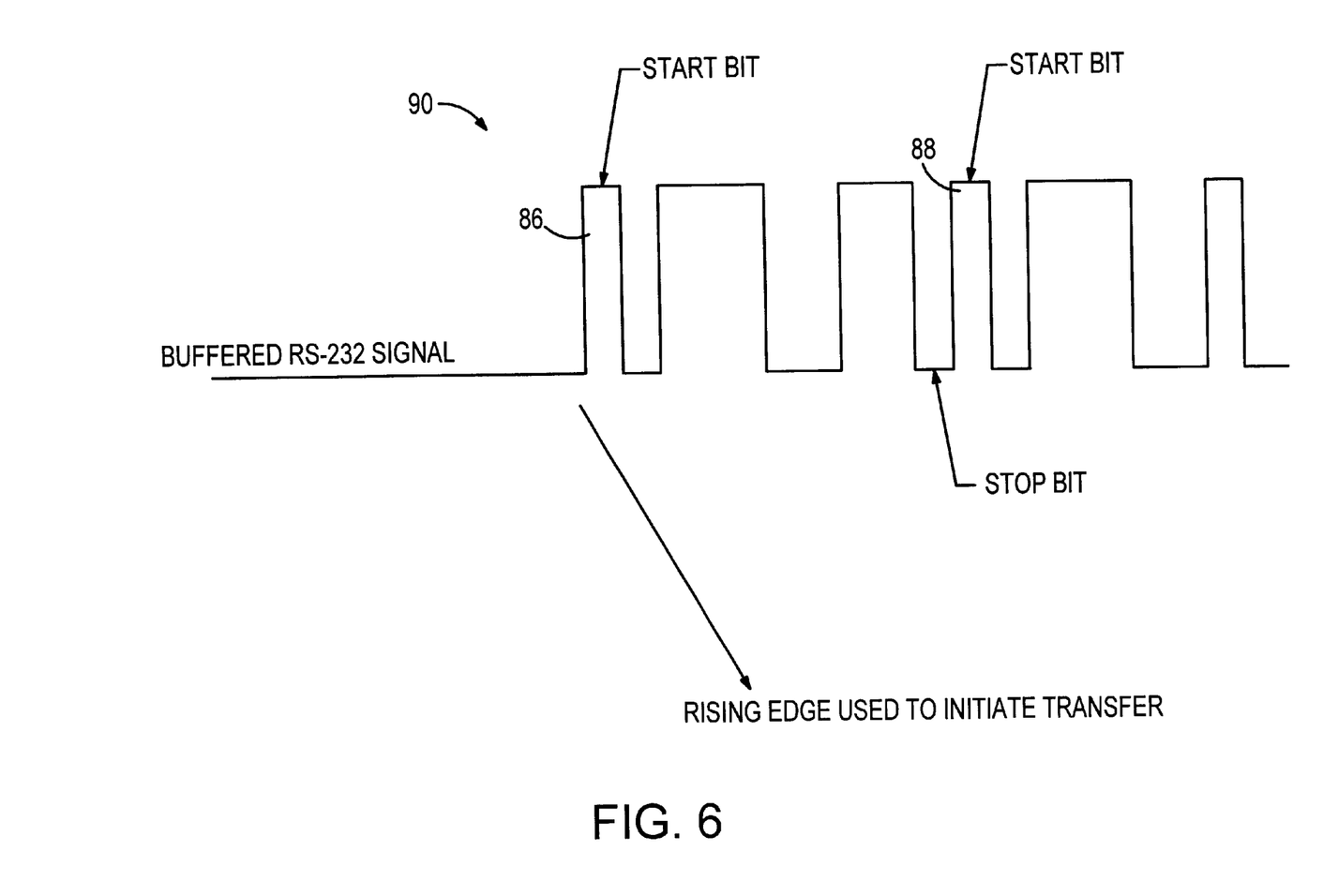
FIG. 6 is an example of an RS-232-compatible signal that is directed to the sensor subsystem of FIG. 2.
Figure 7:
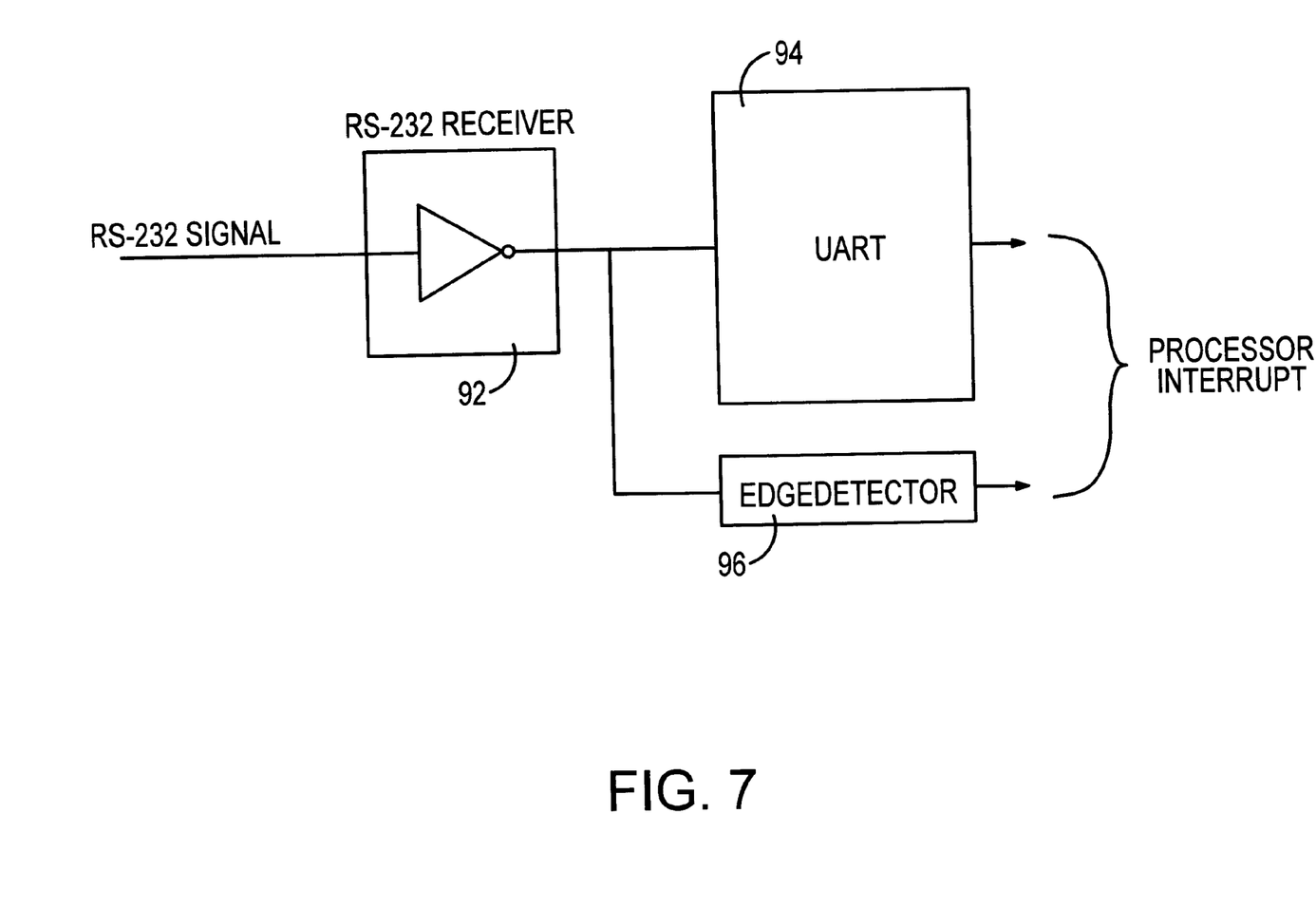
FIG. 7 is a block diagram of the circuitry for processing the incoming signal of FIG. 6.

In the RS-232 protocol, packet-transfer requests and other signals transmitted by the host computer will be in the format of serial packets. An example of a communication is illustrated in FIG. 6. All bytes must begin with a start bit 86 and 88. Rather than waiting for the completion and interpretation of the incoming signal 90, the request responder 36 of FIG. 2 may anticipate that the packet is most likely to be a packet-transfer request and send a packet as soon as it detects the falling edge of the start bit of the first byte of the incoming signal. Thus, the request responder need only be programmed to detect a logic falling edge to begin the response process. This is shown schematically in FIG. 7. A conventional RS-232 receiver 92 is connected to a UART 94 and an edge detector 96. Conventionally, the incoming signal is transferred from the receiver 92 only to the UART. However, the edge detector 96 is positioned in parallel with the UART to simultaneously receive the incoming signal. The edgedetector issues the appropriate processor interrupt when a falling edge of the first start bit is detected. The packet-transfer process is then initiated. Simultaneously, the UART continues to receive the incoming signal. If the incoming signal is a command or a request other than a packet-transfer request, the appropriate processor interrupt is generated to properly respond to the incoming signal. Thus, the anticipation of the signal as a packet-transfer request does not adversely affect the operation of the tracking system.

As previously noted, while the request-and-respond approach has been described primarily with respect to head tracking in a virtual reality system, the invention may be used in other tracking systems. Moreover, there may be more than one instance of the approach. For example, if a data display in a tracking system utilizes image data asynchronously with respect to the supply of image data from a source, the request-and-respond approach may be utilized. In another example, the sensors may be located remotely from the circuitry for extracting either or both of the positional information and angular information from the raw sensor data, and the processing may be asynchronous with respect to the supply of the raw data. Thus, the request-and-respond approach may be implemented at the interface between the sensing circuitry and the circuitry for extracting the positional and/or angular information.

What is claimed is:

1. A method of tracking movement of an object comprising steps of:
   generating packets of tracking data indicative of positions of said object;
   transferring a packet of said tracking data via a data link as a conditioned response to receiving a packet-transfer request;
   receiving transferred packets of said tracking data at an output end of said data link;

processing said transferred packets such that said movement of said object is tracked by operations of said processing; and triggering said packet-transfer requests in response to said processing such that said packets are transferred via said data link in accordance with processing requirements at said output end of said data link.

2. The method of claim 1 wherein said step of generating said packets occurs at a substantially fixed sampling rate and wherein said step of processing includes accessing said transferred packets at a speed less than said sampling rate, said packets being transferred via said data link in a pattern determined by said speed of accessing said transferred packets.

3. The method of claim 2 wherein said step of triggering said packet-transfer requests includes transmitting said packet-transfer requests over said data link in a direction opposite to a flow of said packets.

4. The method of claim 2 further comprising a step of selecting between a presently available packet and a next available packet upon detecting that a packet-transfer request has been triggered, said selection being at least partially based on a length of a time interval between detecting said packet-transfer request and generation of said next available packet.

5. The method of claim 1 wherein said step of processing includes generating image information regarding said object such that said movement of said object is displayed in substantially real time.

6. The method of claim 5 further comprising a step of forming a three-dimensional rendering of said object and said movement based on said step of processing said transferred packets.

7. The method of claim 1 further comprising a step of anticipating reception of one of said packet-transfer requests upon detecting an edge of an incoming signal at an end of said data link opposite to said output end, said step of transferring a packet being initiated in response to said anticipating, thereby providing a low latency with respect to responding to said packet-transfer requests.

8. The method of claim 1 wherein said step of generating packets includes detecting the position of a human head and forming said packets to include information indicative of said position, said human head being said object.

9. A method of managing latency in a system for tracking movement of an object comprising steps of:

forming signals of tracking data at a generally fixed processing rate, said tracking data being specific to said object, including forming said signals using tracking circuitry that is in communication with image processing circuitry via a data link, said image processing circuitry having an irregular processing rate with respect to requiring fresh tracking data;

at a first end of said data link common with said tracking circuitry, detecting when said image processing circuitry is available for processing fresh tracking data including receiving a request for fresh tracking data via said data link and anticipating receptions of said requests upon detecting incoming signals at said first end of said data link, said availability having an irregularity that is at least partially based upon said irregular processing rate of said image processing circuitry; and in response to detecting that said image processing circuitry is available for processing fresh tracking data, transmitting tracking data to said image processing circuitry via said data link, said step of transmitting data being triggered by each anticipation of a reception of one of said requests.

10. The method of claim 9 wherein said step of transmitting tracking data includes transferring a packet of fresh tracking data for each request received at said first end of said data link.

11. The method of claim 10 further comprising processing said fresh tracking data at said image processing circuitry to generate image data representative of movement of said object, said object being a body part of a human.

12. A tracking system comprising:

sensing means coupled to an object of interest for generating packets of tracking data indicative of positions of said object, said sensing means having a substantially fixed data generation rate;

signal processing circuitry for determining image information from said tracking data during a tracking operation; and a data link connecting said sensing means to said signal processing circuitry, said signal processing circuitry being cooperatively configured with said sensing means such that said signal processing circuitry transmits requests to said sensing means for said packets during said tracking operation, said sensing means being responsive to said requests for said packets, said requests being transmitted according to processing requirements of said signal processing circuitry and being transmitted such that a data supply rate from said sensing means to said data link is less than said data generation rate.

13. The tracking system of claim 12 wherein said sensing means includes a sensor connected to a body part of a human, said body part being said object of interest.

14. The tracking system of claim 12 wherein said sensing means is configured to select between transmitting a presently available packet and a next available packet upon receiving each said request, each said selection being based on a length of a time interval between receiving one of said requests and the generation of said next available packet.

15. The tracking system of claim 12 wherein said sensing means is configured to initiate transmission of one of said packets upon detecting reception of a signal via said data link, thereby anticipating that said signal is one of said requests.

16. The tracking system of claim 12 further comprising a video display means operatively associated with said signal processing circuitry to display movement of said object based on said image information.

17. The tracking system of claim 16 wherein said sensing means is enabled to embed angular information into said tracking data, said signal processing circuitry and video display being cooperative with said sensing means to define a virtual reality system.

* * * * *